United States Patent
Lauster

(10) Patent No.: US 10,531,273 B2
(45) Date of Patent: Jan. 7, 2020

(54) HANDLING OF IMS SERVICES IN A ROAMING SCENARIO OF A USER EQUIPMENT

(71) Applicant: DEUTSCHE TELEKOM AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/307,490

(22) PCT Filed: May 8, 2017

(86) PCT No.: PCT/EP2017/060953
§ 371 (c)(1),
(2) Date: Dec. 6, 2018

(87) PCT Pub. No.: WO2017/211524
PCT Pub. Date: Dec. 14, 2017

(65) Prior Publication Data
US 2019/0182656 A1    Jun. 13, 2019

(30) Foreign Application Priority Data
Jun. 8, 2016 (EP) .................................... 16173567

(51) Int. Cl.
*H04W 8/08* (2009.01)
*H04L 29/12* (2006.01)

(52) U.S. Cl.
CPC .......... *H04W 8/08* (2013.01); *H04L 61/2015* (2013.01)

(58) Field of Classification Search
CPC .............. H04L 63/0815; H04L 63/102; H04L 63/0861; H04L 63/08; H04L 63/083;
(Continued)

(56) References Cited

U.S. PATENT DOCUMENTS 10,231,109 B2 * 3/2019 Lauster .................. H04W 4/90
2005/0233727 A1 * 10/2005 Poikselka ............... H04W 4/02
455/404.2
(Continued)

FOREIGN PATENT DOCUMENTS

| WO | WO 2011157366 A1 | 12/2011 |
| WO | WO 2013045176 A1 | 4/2013 |
| WO | WO 2016074747 A1 | 5/2016 |

OTHER PUBLICATIONS

GSMA: "Official Document IR.65 —IMS Roaming and Interworking Guidelines, Version 15.0", Oct. 28, 2014 (Oct. 28, 2014), XP055224748.

(Continued)

*Primary Examiner* — Nimesh Patel
(74) *Attorney, Agent, or Firm* — Leydig, Voit & Mayer, Ltd.

(57) ABSTRACT

A method is provided for handling Internet Protocol Multimedia Subsystem (IMS) services in a roaming scenario of a user equipment. The user equipment is assigned to a home mobile communication network, and the user equipment is connected to a visited mobile communication network. The visited mobile communication network comprises at least one specific first network node among a plurality of first network nodes of the visited mobile communication network. In order to provide IMS services to the user equipment while roaming in the visited mobile communication network, the at least one specific first network node communicates with a second network node of the home mobile communication network. The method comprises: relating the user equipment to the at least one specific first network node in order to provide IMS services to the user equipment while roaming in the visited mobile communication network.

10 Claims, 1 Drawing Sheet

(58) Field of Classification Search
CPC ... H04L 63/10; H04L 63/108; H04L 63/0838; H04L 63/18; H04L 9/0891; H04L 67/306; H04L 41/28; H04L 43/0876; H04L 63/04; H04L 63/062; H04L 63/068; H04L 65/1006; H04L 63/0823; H04L 65/1069; H04L 12/2809; H04L 2012/2841; H04L 67/125; H04L 41/0654; H04L 51/00; H04L 51/38; H04L 61/6054; H04L 65/1073; H04L 65/60; H04L 41/0896; H04L 63/0442; H04L 63/06; H04L 63/0876; H04L 63/0272; H04L 29/12066; H04L 29/12103; H04L 12/6418; H04L 12/66; H04L 2012/6443; H04L 2012/6486; H04L 2463/102; H04L 29/06217; H04L 41/12; H04L 41/5041; H04L 61/20; H04L 61/2007; H04L 61/2015; H04L 61/2076; H04L 65/1016; H04W 84/005; H04W 8/20; H04W 4/80; H04W 8/12; H04W 12/06; H04W 12/08; H04W 4/50; H04W 4/70; H04W 8/06; H04W 8/10; H04W 8/205; H04W 8/26; H04W 4/24; H04W 76/10; H04W 80/04; H04W 84/045; H04W 8/02; H04W 84/16; H04W 92/02; H04W 88/12; H04W 4/04; H04W 88/16; H04W 84/12; H04W 88/08; H04W 4/00; H04W 76/12; H04W 12/10; H04W 48/16; H04W 68/12; H04W 8/005; H04W 8/18; H04W 8/22; H04W 8/08; H04W 88/18; H04W 36/12; H04W 40/00; H04W 72/0426; H04W 76/19; H04W 76/22; H04W 36/0022; H04W 80/10; H04W 8/00; H04B 7/14; H04B 1/0057; H04B 1/006; H04B 1/3833; H04B 1/406; H04B 1/48; H04M 3/42008; H04M 3/42365; H04M 3/42382; H04M 15/60; H04M 15/63; H04M 2201/60; H04M 15/46; H04M 15/49; H04M 15/90; H04M 2207/12; H04M 2207/20; H04M 2215/202; H04M 2215/22; H04M 2215/46; H04M 3/4211; H04M 3/42229; H04M 7/006

See application file for complete search history.

(56) References Cited

U.S. PATENT DOCUMENTS

| | | | |
|---|---|---|---|
| 2013/0080779 A1* | 3/2013 | Holtmanns | H04L 63/0414 713/168 |
| 2014/0342731 A1* | 11/2014 | Carames | H04W 8/02 455/432.1 |
| 2015/0244706 A1* | 8/2015 | Grajek | H04L 63/0815 726/6 |
| 2016/0092696 A1* | 3/2016 | Guglani | G06F 21/335 |
| 2016/0285874 A1* | 9/2016 | Smith | H04L 61/2589 |
| 2017/0094513 A1* | 3/2017 | Kelts | H04W 12/06 |
| 2017/0264439 A1* | 9/2017 | Muhanna | H04W 12/02 |
| 2018/0020386 A1* | 1/2018 | Chandramouli | H04W 36/0027 |
| 2018/0270877 A1* | 9/2018 | Lee | H04W 76/10 |
| 2018/0324585 A1* | 11/2018 | Nair | H04L 63/0442 |

OTHER PUBLICATIONS

"3rd Generation Partnership Project; Technical Specification Group Services and System Aspects; Study on Roaming Architecture for Voice over IMS with Local Breakout; Release 11", 3GPP Standard; 3GPP TR 23.850, 3RD Generation Partnership Project (3GPP), vol. SA WG2, No. V0.4.0, Sep. 14, 2011 (Sep. 14, 2011), pp. 1-35, XP050553771.

* cited by examiner

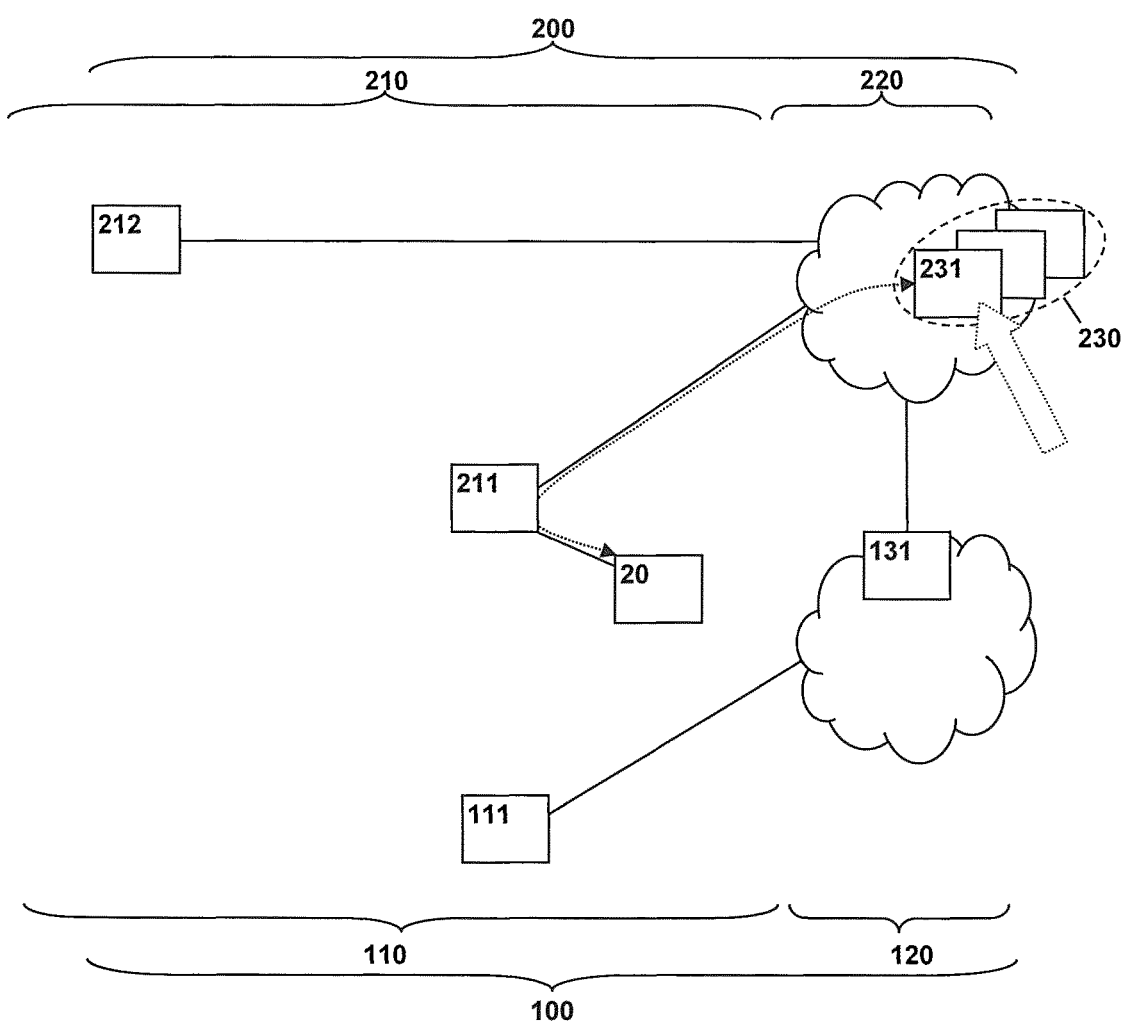

HANDLING OF IMS SERVICES IN A ROAMING SCENARIO OF A USER EQUIPMENT

CROSS-REFERENCE TO RELATED APPLICATIONS

This application is a U.S. National Phase application under 35 U.S.C. § 371 of International Application No. PCT/EP2017/060953, filed on May 8, 2017, and claims benefit to European Patent Application No. EP 16173567.5, filed on Jun. 8, 2016. The International Application was published in English on Dec. 14, 2017 as WO 2017/211524 A1 under PCT Article 21(2).

FIELD

The present invention relates a method for improved handling of IMS (Internet Protocol Multimedia Subsystem) services in a roaming scenario of a user equipment, wherein the user equipment is assigned to a home mobile communication network, and wherein the user equipment is connected to a visited mobile communication network, wherein the visited mobile communication network comprises a plurality of first network nodes to provide IMS services to the user equipment while roaming in the visited mobile communication network.

Furthermore, the present invention relates to a system for improved handling of IMS (Internet Protocol Multimedia Subsystem) services in a roaming scenario of a user equipment, wherein the user equipment is assigned to a home mobile communication network, and wherein the user equipment is connected to a visited mobile communication network, wherein the system comprises the home mobile communication network and the visited mobile communication network, wherein the visited mobile communication network comprises a plurality of first network nodes to provide IMS services to the user equipment while roaming in the visited mobile communication network.

Additionally, the present invention relates to a mobile communication network for improved handling of IMS (Internet Protocol Multimedia Subsystem) services in a roaming scenario of a user equipment, wherein the user equipment is assigned to a home mobile communication network, and wherein the user equipment is connected to the mobile communication network as a visited mobile communication network, wherein the visited mobile communication network comprises a plurality of first network nodes to provide IMS services to the user equipment while roaming in the visited mobile communication network.

Additionally, the present invention relates to a program and to a computer program product for improved handling of IMS (Internet Protocol Multimedia Subsystem) services in a roaming scenario of a user equipment.

The present invention relates to the area of both wireless and nomadic or fixed communications.

BACKGROUND

To support large numbers of (roaming) subscribers—e.g. mobile subscribers or nomadic, i.e. temporarily fixed subscribers—a number of mobile communication networks such as public land mobile networks and/or stationary (fixed line) networks have been established and are operative. Mobile communication networks such as public land mobile networks (PLMNs) may communicatively connect to other mobile communication networks and/or to fixed, land-wired public switched telephone networks (PSTNs) and/or to data networks such as the internet (or IP-networks, internet protocol networks). User equipments (e.g. a mobile or nomadic terminal) are typically assigned to a home mobile communication network, such as a home public land mobile network. In a roaming scenario, the user equipment is typically not located in reach of the home mobile communication network (or home public land mobile network) but is connected to a visited mobile communication network (or visited public land mobile network). Most modern mobile communication networks (such as public land mobile networks or also data networks) are packet-switched networks, in which data are routed in autonomous units called data packets. Packet-switched networks are characterized by high speed, low latency, and high network resource utilization efficiency. Two examples of packet-switched technologies are the General Packet Radio Service (GPRS) of the Global System for Mobile communications (GSM), and the Evolved Packet System (EPS), also commercially known as the Long Term Evolution (LTE), of the Universal Mobile Telecommunications System (UMTS). The Internet Protocol (IP) is a widely-deployed protocol for data communications in packet-switched networks. The IP Multimedia System (IMS) is an industry standard framework for delivering voice and multimedia communications over IP networks. Communications between nodes within an IMS network utilize the Session Initiation Protocol (SIP). SIP is a signaling protocol for Internet conferencing, telephony, presence, events notification, instant messaging, and the like. SIP signaling uses a long-term stable identifier, the SIP Universal Resource Indicator (URI).

Nowadays, numerous operators of mobile communication networks have already launched VoLTE functionality (i.e. Voice over LTE (Long Term Evolution) networks). This also means that the importance of VoLTE roaming is continuously increasing.

For providing VoLTE roaming, different solutions exist, including S8HR (S8 Home Routing) and LBO (Local Breakout) scenarios. Unlike LBO, S8HR does not require IMS network nodes in the visited mobile communication network (i.e. the visited LTE network) and therefore, IMS interoperability testing is not required between the home mobile communication network and the visited mobile communication network, which significantly simplifies implementation. This means that the main issue using a local breakout IMS roaming architecture is the impact on the visited network IMS nodes supporting roaming user equipments (i.e. typically P-CSCF (Proxy-Call Session Control Function), PCRF (Policy and Charging Rules Function), IBCF (Interconnection Border Control Function)), which causes high effort in integration, setup, and testing. However, S8HR is also a source of some serious technical issues, including service continuity problems (especially voice call continuity), as well as drawbacks regarding functionalities such as lawful interception, handover delays, non-authorized user emergency calls for visiting end users of the visited mobile communication network, and deploying existing voice charging models.

SUMMARY

In an exemplary embodiment, the present invention provides a method for handling Internet Protocol Multimedia Subsystem (IMS) services in a roaming scenario of a user equipment. The user equipment is assigned to a home mobile communication network, and the user equipment is connected to a visited mobile communication network. The visited mobile communication network comprises at least one specific first network node among a plurality of first network nodes of the visited mobile communication network. The at least one specific first network node has a configuration provided by the home mobile communication network. In order to provide IMS services to the user equipment while roaming in the visited mobile communication network, the at least one specific first network node communicates with a second network node of the home mobile communication network. The method comprises: relating the user equipment to the at least one specific first network node in order to provide IMS services to the user equipment while roaming in the visited mobile communication network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a system according to the present invention, comprising a first mobile communication network (or home mobile communication network) and a second mobile communication network (or visited mobile communication network), and a user equipment connected to the visited mobile communication network but having the home mobile communication network as its home mobile communication network.

DETAILED DESCRIPTION

Exemplary embodiments of the present invention provide an effective and simple solution (especially reducing operational costs (OPEX costs)) to provide roaming functionalities regarding IMS (Internet Protocol Multimedia Subsystem) services requested by a user equipment—especially VoLTE roaming—such that all charging requirements, routing requirements, and regulatory requirements can be fulfilled as well as a comparably simple implementation of a roaming solution regarding such IMS services can be achieved.

In an exemplary embodiment, the present invention provides a method for improved handling of IMS (Internet Protocol Multimedia Subsystem) services in a roaming scenario of a user equipment, wherein the user equipment is assigned to a home mobile communication network, and wherein the user equipment is connected to a visited mobile communication network, wherein the visited mobile communication network comprises at least one specific first network node among a plurality of first network nodes of the visited mobile communication network, wherein the at least one specific first network node has a configuration provided by the home mobile communication network, wherein, in order to provide IMS services to the user equipment while roaming in the visited mobile communication network, the at least one specific first network node communicates with a second network node of the home mobile communication network, wherein the method comprises the step of the user equipment being related to the at least one specific first network node in order to provide IMS services to the user equipment while roaming in the visited mobile communication network.

It is thereby advantageously possible according to the present invention that a new approach can be realized in order to allow for a local breakout IMS roaming architecture with no impact or requirements on IMS node deployment in the visited mobile communication network, i.e. the roaming functionality can be realized in a (foreign) visited mobile communication network without any impact or any requirements regarding the IMS node deployment of that visited mobile communication network. The already standardized IMS roaming solutions (i.e. local breakout and S8HR architecture) have drawbacks for practical deployment scenarios. The approach according to the present invention improves the local breakout architecture using virtualization technologies to deploy all roaming-specific IMS nodes, in the visited mobile communication network, from the home mobile communication network. The roaming user equipments will find these virtual IMS nodes in the visited mobile communication network with proper configuration like in the home network. Therefore they are able to behave like in the home mobile communication network, and integration and testing impact on the visited mobile communication network can be avoided or at least drastically reduced.

According to the present invention, the main problems of using a local breakout roaming architecture are avoided due to using virtualization technology in order to deploy network nodes or functionalities in the visited mobile communication network. According to an exemplary embodiment, a network operator is able to deploy their IMS network by usage of virtual network functions running on a cloud infrastructure. In this scenario is possible to deploy and setup a virtual instance of IMS nodes for roaming usage directly into the cloud environment of a visited network operator. If such roaming is required, virtual IMS nodes can be created and configured by the home operator (of the user equipment, i.e. the its home mobile communication network), the main issues with local breakout IMS roaming architecture, which is the impact on the visited network IMS nodes supporting roaming UEs (i.e. P-CSCF, PCRF, IBCF) can be avoided.

The present invention refers to a roaming situation of the user equipment (or of a plurality of user equipments), i.e. the user equipment (or the plurality thereof) is (or are)—while being assigned (or registered as a valid subscriber or assigned to a valid subscription) to its (or their) home mobile communication network—connected to the visited mobile communication network, i.e. the user equipment camps (or the user equipments camp) on the visited mobile communication network or on the access network of the visited mobile communication network.

According to the present invention, a method for improved handling of IMS (Internet Protocol Multimedia Subsystem) services is provided for a user equipment that is in a roaming situation, i.e. the user equipment is assigned to the home mobile communication network, and is connected to the visited mobile communication network. In order for the visited mobile communication network to handle different requests from various user equipments (either roaming user equipments or user equipment for which the visited mobile communication network is the home mobile communication network) connected to the visited mobile communication network (such as requests directed to having a communication link established or a communication service provided) the visited mobile communication network comprises a plurality of first network nodes, i.e. network nodes of a certain kind (as well as typically additional network nodes of different kinds).

In an exemplary embodiment, of such first network nodes (or plurality of first network nodes) of the visited mobile communication network, at least one specific first network node has a configuration provided by the home mobile communication network (of the user equipment considered), and, hence, handles such requests (either all such requests or at least part thereof) from the roaming user equipment considered. In case that the visited mobile communication network comprises only one such specific first network node (i.e. having a configuration provided by the home mobile communication network of the user equipment considered), then normally all such requests (of the same type) initiated by the considered roaming user equipment are received or handled by that (unique) specific first network node. However, in case that the visited mobile communication network comprises a plurality of such specific first network nodes (i.e. each having a configuration provided by the home mobile communication network of the user equipment or plurality of user equipments considered), then either the corresponding requests of the considered user equipment or user equipments are distributed among the plurality of such specific first network nodes (e.g. providing load sharing among the plurality of such specific first network nodes), or a one-to-one assignment of a user equipment to such a specific first network is (e.g. initially or upon attachment of the user equipment) provided for and such requests initiated by the considered user equipment or one of such user equipments are always directed to the assigned one of the plurality of specific first network nodes. In any case, the specific first network node (or the plurality of specific first network nodes) has (or have) a configuration provided by the home mobile communication network of the considered user equipment or plurality of considered user equipments.

In the context of certain exemplary embodiments of the present invention, only the case of the relationship of the visited mobile communication network with one home mobile communication network (of the considered user equipment) is mentioned. However, likewise, in case that a first user equipment and a second user equipment—the first user equipment having a first mobile communication network as its home mobile communication network and the second user equipment having a further first mobile communication network as its home mobile communication network—are both roaming in the visited mobile communication network, the present invention provides that the visited mobile communication network not only comprises the specific first network node (the configuration of which being provided by the (first) home mobile communication network of the (first) user equipment) but that the visited mobile communication network additionally also comprises a further specific first network node (the configuration of which being provided by the further first mobile communication network of the second user equipment).

According to the present invention, the IMS services requested by the user equipment are provided to the user equipment (while the user equipment being roaming in the visited mobile communication network) via the at least one specific first network node communicating with a second network node of the home mobile communication network, hence performing local breakout. In order for such a functionality being performed smoothly, the considered user equipment is related to the at least one specific first network node in order to provide IMS services to the user equipment while roaming in the visited mobile communication network, i.e. any user equipment (roaming within the considered visited mobile communication network) either needs to have a piece of (addressing) information sufficient for a request (related to IMS services provided to the considered user equipment) being routed to the specific first network node (within the visited mobile communication network), or at least (without the considered user equipment having such a piece of information) such a request needs to be routed or directed (by the visited mobile communication network) to the specific first network node.

According to the present invention it is preferred that the plurality of first network nodes comprises—besides the at least one specific first network node—at least one further first network node, and especially a plurality of further first network nodes, wherein the at least one further first network node has a configuration provided by the visited mobile communication network, wherein the plurality of first network nodes are especially accessed via other network nodes within the visited mobile communication network.

Thereby, it is advantageously possible according to the present invention that the deployment of the specific first network node (within the visited mobile communication network) can be made without interfering with the deployment and/or functionality of the further first network node (or, more likely, the plurality of further first network nodes) having a configuration provided by the visited mobile communication network itself (and, hence, not provided by the home mobile communication network of the user equipment considered (roaming in the visited mobile communication network)).

According to a further embodiment of the present invention, the functionality of the plurality of first network nodes correspond to the functionality of at least one out of the following network nodes:
  a P-CSCF (Proxy Call Session Control Function) network node,
  the functionality of a SBC (Session Border Controller) network node,
  a V-PCRF (Visited Policy and charging rules function),
  an IBCF (Interconnection Border Control Function).

Thereby, it is advantageously possible according to the present invention that the relevant network nodes or the relevant functionalities needed to interface with roaming user equipments within the visited mobile communication network can be realized as "first network nodes", i.e. having—especially besides the further first network nodes having a configuration provided by the visited mobile communication network itself—at least their configuration provided by the respective home mobile communication network of the user equipment or plurality of user equipments considered.

According to a further embodiment of the present invention, it is also possible and preferred that the configuration—defined by the home mobile communication network and/or provided to the visited mobile communication network by the home mobile communication network—of the at least one specific first network node within the visited mobile communication network is provided by deploying a virtual instance of the at least one specific first network node to the visited mobile communication network and/or by the visited mobile communication network downloading a virtual instance of the at least one specific network node from the home mobile communication network, especially from a repository provided by the home mobile communication network.

According to the present invention, it is thereby advantageously possible that the configuration related to the specific first network node (or configuration information related to the specific first network node) can be transmitted to the visited mobile communication network via different transmission paths.

According to further embodiments of the present invention, it is advantageously possible that the user equipment is related to the at least one specific first network node via a dynamic addressing method, especially
  using a domain name system (DNS), and/or
  using a dynamic host configuration protocol (DHCP) functionality, and/or
  using packet data network (PDN) functionality.

Alternatively or cumulatively to relating the user equipment to the at least one specific first network node via a dynamic addressing method, it is advantageously possible according to the present invention that the user equipment is related to the at least one specific first network node via statically configuring, within the user equipment, an address information of the at least one specific first network node in order that a request message transmitted by the user equipment—especially relating to initiating or requesting IMS services—is received by the at least one specific first network node, wherein statically configuring is especially performed
  during initial provisioning, especially in the ISIM (IP Multimedia Services Identity Module) module of the user equipment, and/or
  via an IMS Management Object (MO), and/or
  during establishment of a PDP (Packet Data Protocol) context related to the user equipment.

Via using a dynamic addressing method and/or via statically configuring the user equipment, it is advantageously possible according to the present invention that it can be assured in a comparatively easy manner that requests of the roaming user equipment or of the plurality of roaming user equipments are directed to the specific first network node (or to one of the plurality of such specific first network nodes) within the visited mobile communication network.

According to a further preferred embodiment of the present invention, the IMS services relate to or comprise at least one out of the following:
  voice services,
  video services,
  SMS over IP services,
  RCS communication services.

Furthermore, the present invention relates to a method for configuring a visited mobile communication network in view of an improved handling of IMS (Internet Protocol Multimedia Subsystem) services of a user equipment while roaming in the visited mobile communication network, wherein the configuration—defined by the home mobile communication network and/or provided to the visited mobile communication network by the home mobile communication network—of the at least one specific first network node within the visited mobile communication network is provided by deploying a virtual instance of the at least one specific first network node to the visited mobile communication network and/or by the visited mobile communication network downloading a virtual instance of the at least one specific network node from the home mobile communication network, especially from a repository provided by the home mobile communication network.

Thereby, it is advantageously possible to use the specific first network node to handle requests initiated by user equipments (having the home mobile communication network as their home mobile communication network) and thus reducing the efforts to provide roaming related to IMS services for such user equipments.

Furthermore, the present invention relates to a system for improved handling of IMS (Internet Protocol Multimedia Subsystem) services in a roaming scenario of a user equipment, wherein the user equipment is assigned to a home mobile communication network, and wherein the user equipment is connected to a visited mobile communication network, wherein the system comprises the home mobile communication network and the visited mobile communication network, wherein the visited mobile communication network comprises at least one specific first network node among a plurality of first network nodes of the visited mobile communication network, wherein the at least one specific first network node has a configuration provided by the home mobile communication network, wherein, in order to provide IMS services to the user equipment while roaming in the visited mobile communication network, the at least one specific first network node communicates with a second network node of the home mobile communication network, wherein the system is configured such that the user equipment is related to the at least one specific first network node in order to provide IMS services to the user equipment while roaming in the visited mobile communication network.

Thereby, it is advantageously possible to provide a system that is capable of providing roaming functionality regarding IMS services in an easy manner and to avoid problems of using a local breakout roaming architecture due to using virtualization technology in order to deploy network nodes or functionalities in the visited mobile communication network based on configuration information provided, respectively, by the home mobile communication network of the considered user equipments.

According to the present invention, it is furthermore preferred that the plurality of first network nodes comprises—besides the at least one specific first network node— at least one further first network node, and especially a plurality of further first network nodes, wherein the at least one further first network node has a configuration provided by the visited mobile communication network, wherein the plurality of first network nodes are especially accessed via other network nodes within the visited mobile communication network.

Furthermore according to the present invention, it is furthermore preferred that the functionality of the plurality of first network nodes correspond to the functionality of at least one out of the following network nodes:
  a P-CSCF (Proxy Call Session Control Function) network node,
  the functionality of a SBC (Session Border Controller) network node,
  a PCRF (Policy and charging rules function),
  an IBCF (Interconnection Border Control Function).

Still additionally according to the present invention, it is furthermore preferred that the system is configured such that the configuration—defined by the home mobile communication network and/or provided to the visited mobile communication network by the home mobile communication network—of the at least one specific first network node within the visited mobile communication network is provided by deploying a virtual instance of the at least one specific first network node to the visited mobile communication network and/or by the visited mobile communication network downloading a virtual instance of the at least one specific network node from the home mobile communication network, especially from a repository provided by the home mobile communication network.

Furthermore, the present invention relates to mobile communication network for improved handling of IMS (Internet Protocol Multimedia Subsystem) services in a roaming scenario of a user equipment, wherein the user equipment is assigned to a home mobile communication network, and wherein the user equipment is connected to the mobile communication network as a visited mobile communication network, wherein the mobile communication network comprises at least one specific first network node among a plurality of first network nodes of the mobile communication network, wherein the at least one specific first network node has a configuration provided by the home mobile communication network, wherein, in order to provide IMS services to the user equipment while roaming in the mobile communication network, the at least one specific first network node communicates with a second network node of the home mobile communication network, wherein the mobile communication network is configured such that the user equipment is related to the at least one specific first network node in order to provide IMS services to the user equipment while roaming in the mobile communication network.

Thereby, it is advantageously possible to provide the mobile communication network as a visited mobile communication network that is capable of providing roaming functionality regarding IMS services in an easy manner and to avoid problems of using a local breakout roaming architecture due to using virtualization technology in order to deploy network nodes or functionalities in the visited mobile communication network based on configuration information provided, respectively, by the home mobile communication network of the considered user equipments.

Additionally, the present invention relates to a program comprising a computer readable program code which, when executed on a computer or on a network node of a home mobile communication network or on a network node of a visited mobile communication network, or in part on the network node of the home mobile communication network and in part on the network node of the visited mobile communication network, causes the computer or the network node of the home mobile communication network or the network node of the visited mobile communication network to perform an exemplary embodiment of the inventive method.

Still additionally, the present invention relates to a computer program product for improved handling of IMS (Internet Protocol Multimedia Subsystem) services in a roaming scenario of a user equipment, the computer program product comprising a computer program stored on a storage medium, the computer program comprising program code which, when executed on a computer or on a network node of a home mobile communication network or on a network node of a visited mobile communication network, or in part on the network node of the home mobile communication network and in part on the network node of the visited mobile communication network, causes the computer or the network node of the home mobile communication network or the network node of the visited mobile communication network to perform an exemplary embodiment the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a first mobile communication network 100, e.g. a mobile communication network such as a public land mobile network, and a second mobile communication network 200, likewise e.g. a mobile communication network such as a public land mobile network, are schematically shown. The first mobile communication network 100 is associated to (or assigned to) a user equipment 20 (or the user equipment 20 is assigned to the first mobile communication network 100), resulting in the first mobile communication network 100 being the home mobile communication network of the user equipment 20. The present invention relates to the situation of the user equipment 20 being in a roaming situation, i.e. the user equipment 20 being connected not to the home mobile communication network but to the second mobile communication network 200, which is referred to by the term visited mobile communication network.

The home mobile communication network comprises a first access network 110 (also called home access network) or access part and a first core network 120 (also called home core network). The home mobile communication network is, e.g., a cellular mobile communication network comprising typically a plurality of network cells. The first (or home) access network 110 comprises at least one first access entity 111 such as (especially in case of mobile communication networks) a base station entity enabled to serve a user equipment 20. In case of the home mobile communication network being a mobile communication network, the first access entity 111 typically serves a radio cell, i.e. a radio coverage area of the access entity (or base station entity) or associated to the first access entity 111, and the user equipment 20 is able to be connected to the first access entity 111 via a radio link or a wireless communication link. In case of the home mobile communication network being a fixed communication network, the first access entity 111 is typically a network access point to which the user equipment 20 is able to be connected by a wireline connection, or the first access entity 111 is connected to a local wireless access point, providing the possibility for the user equipment 20 to be connected to the first access entity 111 via a wireless communication link. The visited mobile communication network comprises a second access network 210 (also called visited access network) or access part and a second core network 220 (also called visited core network). The visited mobile communication network is, e.g., a cellular mobile communication network comprising typically a plurality of network cells (not depicted in FIG. 1). The second access network 210 comprises at least one second access entity 211 such as (especially in case of mobile communication networks) a base station entity enabled to serve the user equipment 20. In case of the visited mobile communication network being a mobile communication network, the second access entity 211 typically serves a radio cell, i.e. a radio coverage area of the second access entity 211 (or base station entity) or associated to the second access entity 211, and the user equipment 20 is able to be connected to the second access entity 211 via a radio link or wireless communication link. In case of the visited mobile communication network being a fixed communication network, the second access entity 211 is typically a network access point to which the user equipment 20 is able to be connected by a wireline connection, or the second access entity 211 is connected to a local wireless access point, providing the possibility for the user equipment 20 to be connected to the first access entity 111 via a wireless communication link.

In the exemplary representation of a roaming situation depicted in FIG. 1, the user equipment 20 is connected—while being assigned (or associated) to the home mobile communication network—to the second access entity 211 of the visited mobile communication network. Furthermore, a further second access entity 212 is schematically shown in FIG. 1 as being part of the visited mobile communication network.

In such a roaming situation of the user equipment 20, in case that a type of call handling involving local breakout is used (i.e. the proxy functionality of the visited mobile communication network (and not of the home mobile communication network) is used), a network node of the visited mobile communication network is primarily used for call handling, such as a proxy call session control function of the visited mobile communication network.

According to an exemplary embodiment, the visited mobile communication network comprises at least one specific first network node 231 among a plurality of first network nodes 230 of the visited mobile communication network, wherein the at least one specific first network node 231 has a configuration provided by the home mobile communication network, wherein, in order to provide IMS services to the user equipment 20 while roaming in the visited mobile communication network, the at least one specific first network node 231 communicates with a second network node 131 of the home mobile communication network, thereby especially realizing a local breakout functionality.

Furthermore according to an exemplary embodiment, the user equipment 20 is related to the at least one specific first network node 231 in order to provide IMS services to the user equipment while roaming in the visited mobile communication network. The user equipment 20 is especially related to the at least one specific first network node 231 via a dynamic addressing method, especially using a domain name system (DNS), and/or via using a dynamic host configuration protocol (DHCP) functionality, and/or via using packet data network (PDN) functionality. Alternatively or cumulatively, the user equipment 20 is especially related to the at least one specific first network node 231 via statically configuring, within the user equipment 20, an address information of the at least one specific first network node 231 in order that a request message transmitted by the user equipment 20—especially relating to initiating or requesting IMS services—is received by the at least one specific first network node 231, wherein statically configuring is especially performed during initial provisioning, especially in the ISIM (IP Multimedia Services Identity Module) module of the user equipment 20, and/or via an IMS Management Object (MO), and/or during establishment of a PDP (Packet Data Protocol) context related to the user equipment 20.

According to the present invention, it is advantageously possible that a new approach can be realized in order to allow for a local breakout IMS roaming architecture with no impact or requirements on IMS node deployment in the visited mobile communication network (i.e. the second mobile communication network 200). This means that by providing the specific first network node 231 in the second (visited) mobile communication network 200, the roaming functionality can be realized in the second (visited) mobile communication network 200 without any impact or any requirements regarding the IMS node deployment of that second (visited) mobile communication network 200. The present invention improves the local breakout architecture using virtualization technologies to deploy all roaming-specific IMS nodes in the second (visited) mobile communication network 200 from the first (home) mobile communication network 100. The roaming user equipments (such as user equipment 20) will find these virtual IMS nodes in the second (visited) mobile communication network 200 with proper configuration like in the first (home) mobile communication network 100. Therefore they are able to behave like in the first (home) mobile communication network 100 and integration and testing impact on the second (visited) mobile communication network 200 can either be avoided or at least drastically reduced.

The virtual instances (of the specific first network node 231 or of a plurality of specific first network nodes) used for roaming are configured and created by the first (home) operator (of the first (home) mobile communication network 100 of the user equipment 20) in similar way as for local usage (within the first (home) mobile communication network 100). The home operator (or operator of the first mobile communication network 100) can either deploy these virtual instances of all required IMS roaming nodes (such as, e.g., P-CSCF, PCRF, IBCF) to the second (visited) mobile communication network 200 (and/or its cloud environment) or the second (visited) mobile communication network 200 is offered to download pre-created virtual instances (of such specific first network nodes 231) from a repository provided by the (home) operator of the first (home) mobile communication network 100. Afterwards, as these virtual instances are deployed in the cloud environment of the second (visited) mobile communication network 200 (or in the cloud environment of its operator), and a roaming user equipment 20 (of the first (home) mobile communication network 100) finds such IMS nodes (i.e. the specific first network nodes 231) based on standardized procedures such as, e.g., dynamic procedure, via DNS, DHCP, PDN or via a static configuration. The user equipment 20 is then able to use such specific first network nodes 231 like the local nodes deployed in first (home) mobile communication network 100, i.e. roaming testing and integration can be limited and has minimal impact on the second (visited) mobile communication network and/or its operator.

A further advantage according to the present invention is that the user equipment 20 (or the plurality of user equipments even though only one user equipment is schematically shown in FIG. 1) will find these virtual IMS nodes in the second (visited) mobile communication network 200 and these network nodes furthermore have the proper configuration, i.e. the configuration like in the first (home) mobile communication network 100 and, hence, can work like in first (home) mobile communication network, leading to a reduction in testing regarding the deployment to the visited network operator (as all virtualized network nodes are configured and deployed by the operator of the first (home) mobile communication network 100). This allows to reduce drawbacks of the local breakout roaming architecture.

According to the present invention, the configuration of the at least one specific first network node 231 is provided by the first (home) mobile communication network 100. According to a variant of the present invention, this could be done via transmitting a set of configuration parameters (relating to the at least one specific first network node 231). It is preferred according to the present invention that the configuration—defined by the first (home) mobile communication network 100 and/or provided to the visited mobile communication network 200 by the home mobile communication network 100—of the at least one specific first network node 231 within the visited mobile communication network 200 is provided by deploying a virtual instance of the at least one specific first network node 231 to the second (visited) mobile communication network 200 and/or by the second (visited) mobile communication network (200) downloading a virtual instance of the at least one specific network node 231 from the first (home) mobile communication network 100, especially from a repository provided by the first (home) mobile communication network 100.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling Internet Protocol (IP) Multimedia Subsystem (IMS) services in a roaming scenario of a user equipment, wherein the user equipment is assigned to a home mobile communication network, and wherein the user equipment is connected to a visited mobile communication network, wherein the method comprises:
   relating the user equipment to at least one specific first network node of a plurality of first network nodes of the visited mobile communication network in order to provide IMS services to the user equipment while the user equipment is roaming in the visited mobile communication network, wherein the at least one specific first network node has a configuration provided by the home mobile communication network; and
   providing the IMS services to the user equipment while the user equipment is roaming in the visited mobile communication network, wherein providing the IMS services to the user equipment while the user equipment is roaming in the visited mobile communication network comprises: communicating, by the at least one specific first network node, with a second network node of the home mobile communication network;
   wherein the at least one specific first network node comprises the functionality of at least one out of the following network nodes:
      a Proxy Call Session Control Function (P-CSCF) network node;
      a Session Border Controller (SBC) network node;
      a Visited Policy and charging rules function (V-PCRF), or
      an Interconnection Border Control Function (IBCF).

2. The method according to claim 1, wherein the plurality of first network nodes comprises—besides the at least one specific first network node—at least one further first network node, wherein the at least one further first network node has a configuration provided by the visited mobile communication network.

3. The method according to claim 1, wherein the configuration of the at least one specific first network node within the visited mobile communication network is provided by deploying a virtual instance of the at least one specific first network node to the visited mobile communication network and/or by the visited mobile communication network downloading a virtual instance of the at least one specific network node from the home mobile communication network.

4. The method according to claim 1, wherein the user equipment is related to the at least one specific first network node via a dynamic addressing method, wherein the dynamic addressing method comprises:
   using a domain name system (DNS); and/or
   using a dynamic host configuration protocol (DHCP) functionality; and/or
   using packet data network (PDN) functionality.

5. The method according to claim 1, wherein the user equipment is related to the at least one specific first network node via statically configuring, within the user equipment, address information of the at least one specific first network node in order that a request message transmitted by the user equipment is received by the at least one specific first network node;
   wherein the statically configuring is performed:
      during initial provisioning in the IP Multimedia Services Identity Module (ISIM) module of the user equipment; and/or
      via an IMS Management Object (MO); and/or
      during establishment of a Packet Data Protocol (PDP) context related to the user equipment.

6. The method according to claim 1, wherein the IMS services relate to or comprise at least one out of the following:
   voice services;
   video services;
   short message service (SMS) over IP services; or
   Rich Communication Services (RCS) communication services.

7. A system for handling Internet Protocol Multimedia Subsystem (IMS) services in a roaming scenario of a user equipment, wherein the system comprises:
- a home mobile communication network, wherein the user equipment is assigned to the home mobile communication network;
- a visited mobile communication network, wherein the user equipment is connected to the visited mobile communication network;
- wherein the visited mobile communication network comprises at least one specific first network node among a plurality of first network nodes of the visited mobile communication network, wherein the at least one specific first network node has a configuration provided by the home mobile communication network, wherein the at least one specific first network node is configured to communicate with a second network node of the home mobile communication network in order to provide IMS services to the user equipment while the user equipment is roaming in the visited mobile communication network;
- wherein the user equipment is related to the at least one specific first network node in order to provide IMS services to the user equipment while the user equipment is roaming in the visited mobile communication network; and
- wherein the at least one specific first network node comprises the functionality of at least one out of the following network nodes:
  - a Proxy Call Session Control Function (P-CSCF) network node;
  - a Session Border Controller (SBC) network node;
  - a Visited Policy and charging rules function (V-PCRF); or
  - an Interconnection Border Control Function (IBCF).

8. The system according to claim 7, wherein the plurality of first network nodes comprises—besides the at least one specific first network node—at least one further first network node, wherein the at least one further first network node has a configuration provided by the visited mobile communication network.

9. The system according to claim 7, wherein the configuration of the at least one specific first network node within the visited mobile communication network is provided by deploying a virtual instance of the at least one specific first network node to the visited mobile communication network and/or by the visited mobile communication network downloading a virtual instance of the at least one specific network node from the home mobile communication network.

10. A non-transitory computer-readable medium having processor-executable instructions stored thereon for handling Internet Protocol Multimedia Subsystem (IMS) services in a roaming scenario of a user equipment, wherein the user equipment is assigned to a home mobile communication network, and wherein the user equipment is connected to a visited mobile communication network, wherein the processor-executable instructions, when executed, facilitate:
- relating the user equipment to the at least one specific first network node of a plurality of first network nodes of the visited mobile communication network in order to provide IMS services to the user equipment while the user equipment is roaming in the visited mobile communication network, wherein the at least one specific first network node has a configuration provided by the home mobile communication network; and
- providing the IMS services to the user equipment while the user equipment is roaming in the visited mobile communication network, wherein providing the IMS services to the user equipment while the user equipment is roaming in the visited mobile communication network comprises: communicating, by the at least one specific first network node, with a second network node of the home mobile communication network;
- wherein the at least one specific first network node comprises the functionality of at least one out of the following network nodes:
  - a Proxy Call Session Control Function (P-CSCF) network node;
  - a Session Border Controller (SBC) network node;
  - a Visited Policy and charging rules function (V-PCRF); or
  - an Interconnection Border Control Function (IBCF).

* * * * *